United States Patent
Wang et al.

(10) Patent No.: US 8,081,410 B1
(45) Date of Patent: Dec. 20, 2011

(54) OVERCURRENT PROTECTION CIRCUIT

(75) Inventors: Zhao Wang, Beijing (CN); Hang Yin, Beijing (CN); Dave Xiao Dong Yang, Beijing (CN)

(73) Assignees: Vimicro Corporation, Beijing (CN); Wuxi Vimicro Corporation, Jiangsu (CN)

( * ) Notice: Subject to any disclaimer, the term of this patent is extended or adjusted under 35 U.S.C. 154(b) by 874 days.

(21) Appl. No.: 12/129,403

(22) Filed: May 29, 2008

(51) Int. Cl.
*H02H 3/08* (2006.01)
(52) U.S. Cl. .................................... 361/93.1
(58) Field of Classification Search .............. 361/93.1
See application file for complete search history.

(56) References Cited

U.S. PATENT DOCUMENTS

| | | | |
|---|---|---|---|
| 4,774,480 A * | 9/1988 | Sato et al. | 331/1 A |
| 6,411,483 B1 * | 6/2002 | Sarles et al. | 361/93.4 |
| 7,558,037 B1 * | 7/2009 | Gong et al. | 361/93.1 |
| 7,633,347 B2 * | 12/2009 | Tan et al. | 331/16 |
| 7,728,681 B2 * | 6/2010 | Gong | 331/111 |
| 7,830,120 B2 * | 11/2010 | Ibrahim | 320/134 |
| 2004/0150927 A1 * | 8/2004 | Strayer et al. | 361/82 |
| 2008/0218277 A1 * | 9/2008 | Tan et al. | 331/17 |

* cited by examiner

*Primary Examiner* — Ronald W Leja
(74) *Attorney, Agent, or Firm* — Wuxi Sino-US IP Agency, Ltd; Joe Zheng

(57) ABSTRACT

Designs of an overcurrent protection circuit Techniques are disclosed. According to one aspect of the present invention, an overcurrent protection having continuous protection thresholds is provided to efficiently protect a battery from discharging overcurrent especially in all intermediate states.

17 Claims, 4 Drawing Sheets

OVERCURRENT PROTECTION CIRCUIT

BACKGROUND OF THE INVENTION

1. Field of the Invention

The present invention relates to a protection circuit, more particularly to an overcurrent protection circuit of a battery.

2. Description of Related Art

It is well known that a Lithium ion battery has been broadly used as a battery cell of a battery pack, since the Lithium ion battery generates a high energy density per weight and volume, and generally provides a reduction in size and weight of a portable type apparatus. However, the Lithium ion battery has a safety problem that its performance characteristic is degraded when it is charged by an overvoltage, and what is more, it even tends to become explosive if it is operated beyond its capacity. Hence, every Lithium ion battery cell needs a protection circuit. The protection circuit commonly comprises charging overvoltage protection, discharging overvoltage protection, charging overcurrent protection, discharging overcurrent protection and short circuit protection.

The discharging overcurrent protection is that when the battery is discharged through a load resistor, the discharging current exceeds a related overcurrent voltage protection threshold $V_{EDI}$ and this state keeps a period of time beyond a certain delay time $T_{EDI}$, the battery protection circuit switches off the discharging path to prohibit discharging, thereby entering the overcurrent protection state. When the discharging current is further increased beyond a related short voltage protection threshold $V_{SC}$ and this state keeps a period of time beyond a certain delay time $T_{SC}$, the battery protection circuit switches off the discharging path to prohibit charging, thereby entering the short protection state. The short protection state and the overcurrent protection state are the same for a control circuit and both aim to prohibit discharging in the circuit. Exiting conditions of the two protection state are the same too and both are that the voltage drop between the VM node and the G node is less than the voltage threshold $V_{EDI}$ and this state keeps a period of time beyond a certain delay time. The main difference of the two states is that the short voltage protection threshold $V_{SC}$ is larger than the overcurrent voltage protection threshold $V_{EDI}$, and the delay time $T_{SC}$ is less than the delay time $T_{EDI}$. Namely, the more the discharging overcurrent is, the shorter the delay time is.

In the prior art, several discharging overcurrent thresholds and one short threshold may be configured for discharging overcurrent protection. However, other overcurrent states do exist among the several protections. The conventional protection scheme can not efficiently protect the battery from discharging overcurrent especially in the intermediate states.

Thus, improved techniques for overcurrent protection circuit having continuous protection thresholds are desired to overcome the above disadvantages.

SUMMARY OF THE INVENTION

This section is for the purpose of summarizing some aspects of the present invention and to briefly introduce some preferred embodiments. Simplifications or omissions in this section as well as in the abstract or the title of this description may be made to avoid obscuring the purpose of this section, the abstract and the title. Such simplifications or omissions are not intended to limit the scope of the present invention.

An overcurrent or excess current is a situation where a larger than intended current flows through a device, leading to excessive generation of heat and the risk of damaging an infrastructure, equipment and causing fires. Possible causes for overcurrent include short circuits, excessive load, and incorrect design. Fuses, circuit breakers, temperature sensors and current limiters are commonly used protection mechanisms to control the risks of overcurrent. The present invention provides designs of an overcurrent protection circuit that may be used to prevent such an overcurrent. In particular, a protection scheme, as disclosed herein, having continuous protection thresholds may efficiently protect a battery from discharging overcurrent especially in all intermediate states.

Objects, features, and advantages of the present invention will become apparent upon examining the following detailed description of an embodiment thereof, taken in conjunction with the attached drawings.

BRIEF DESCRIPTION OF THE DRAWINGS

These and other features, aspects, and advantages of the present invention will become better understood with regard to the following description, appended claims, and accompanying drawings where:

DETAILED DESCRIPTION OF THE INVENTION

The detailed description of the present invention is presented largely in terms of procedures, steps, logic blocks, processing, or other symbolic representations that directly or indirectly resemble the operations of devices or systems contemplated in the present invention. These descriptions and representations are typically used by those skilled in the art to most effectively convey the substance of their work to others skilled in the art.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments. Further, the order of blocks in process flowcharts or diagrams or the use of sequence numbers representing one or more embodiments of the invention do not inherently indicate any particular order nor imply any limitations in the invention.

Embodiments of the present invention are discussed herein with reference to FIGS. 1-8. However, those skilled in the art will readily appreciate that the detailed description given herein with respect to these figures is for explanatory purposes only as the invention extends beyond these limited embodiments.

Figure 1:
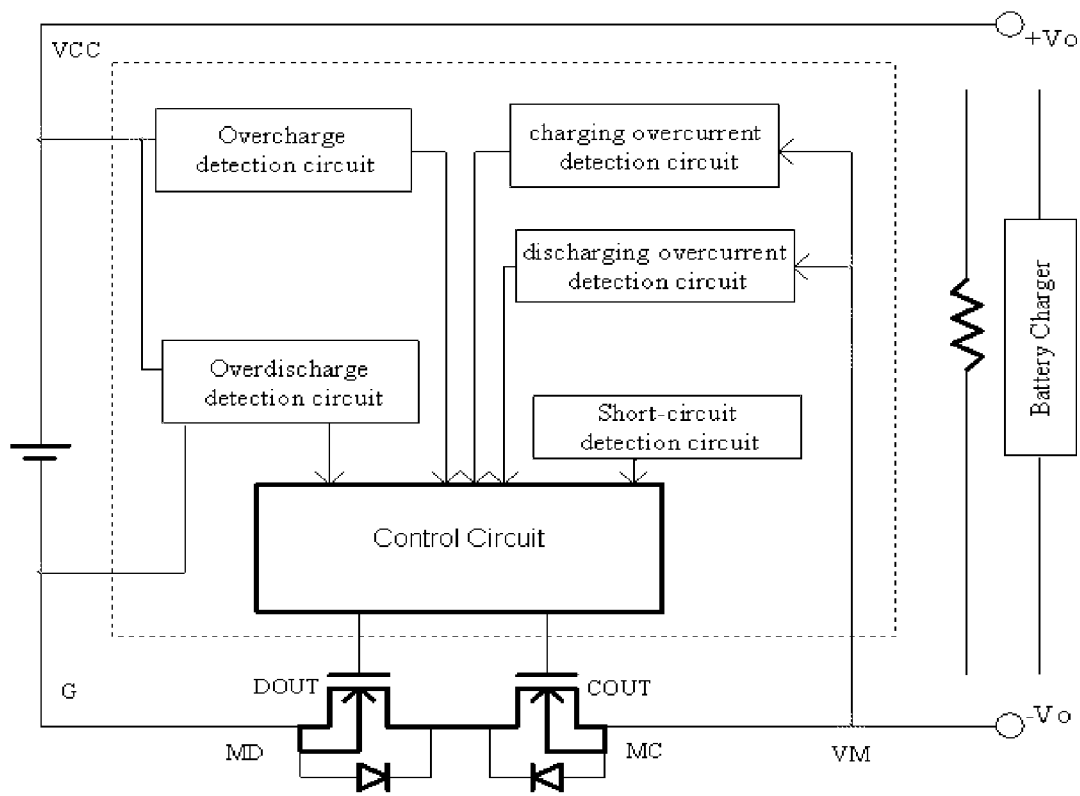
FIG. 1 is a circuit diagram showing one conventional battery protection circuit with two stages discharging overcurrent protection.

FIG. 1 is a circuit diagram showing a battery protection circuit with two stages discharging overcurrent protection. The protection circuit comprises an overcharge detection circuit, an overdischarge detection circuit, a charging overcurrent detection circuit, a discharging overcurrent detection circuit, a short detection circuit, a control circuit and output switches MD and MC.

The discharging overcurrent detection circuit is configured to determine whether there is discharging overcurrent on the battery by detecting a voltage drop on the output switches MD and MC (between a node VM and a node G) and comparing the voltage drop with a certain voltage protection threshold $V_{EDI}$. Provided that the turn-on resistances of the output switches MD and MC are expressed as $R_{ON\_MD}$ and $R_{ON\_MC}$, so the overcurrent protection threshold $I_{EDI}$ may be:

$$I_{EDI} = \frac{V_{EDI}}{R_{ON\_MD} + R_{ON\_MC}}$$

When the discharging current increases beyond the protection current threshold $I_{EDI}$ and this state keeps a period of time beyond a certain delay time $T_{EDI}$, the control circuit outputs a control signal to switch off the output switches MD and MC. Thus, the discharging of the battery is prohibited and the protection circuit enters a discharging overcurrent protection state.

The short detection circuit is configured to determine whether there is short on the battery by detecting the voltage drop on the output switches MD and MC (between a node VM and a node G) and comparing the voltage drop with a certain voltage protection threshold $V_{SC}$. Similarly, the short current protection threshold $I_{SC}$ is:

$$I_{SC} = \frac{V_{SC}}{R_{ON\_MD} + R_{ON\_MC}}$$

When the discharging current increases beyond the short current protection threshold $I_{SC}$ and this state keeps a period of time beyond a certain delay time $T_{SC}$, the control circuit outputs a control signal to switch off the output switches MD and MC. Thus, the discharging of the battery is prohibited and the protection circuit enters a short protection state. The short protection state and the overcurrent protection state are the same for the control circuit and both aim to prohibit discharging of the battery. Exiting conditions of the two protection state are the same too and both are that the voltage drop between the VM node and the G node is less than the voltage threshold $V_{EDI}$ and this state keeps a period of time beyond a certain delay time. The main difference of the two states is that the short voltage protection threshold $V_{SC}$ is larger than the overcurrent voltage protection threshold $V_{EDI}$, and the delay time $T_{SC}$ is less than the delay time $T_{EDI}$.

For the same battery voltage, the more the discharging current is, the more the power consumption in the same time is, the more the generated heat is. A lot of electronic systems are destroyed due to overheat. Provided that the battery voltage is $V_B$, the battery current is $I_B$, so the caloric P generated in certain period of time T may be:

$$P = V_B \cdot I_B \cdot T$$

Figure 2:
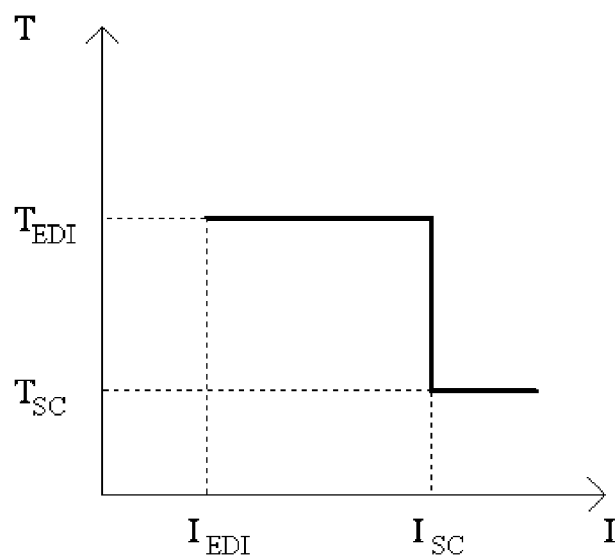
FIG. 2 is a curve diagram showing a relation between a discharging overcurrent and a delay time of the battery protection circuit shown in FIG. 1.

Hence, the more the discharging current is, the shorter the delay time needs to be. FIG. 2 is a curve diagram showing a relation between a discharging overcurrent and a delay time of the battery protection circuit shown in FIG. 1. As shown in FIG. 2, when the discharging current is larger than the protection threshold $I_{EDI}$ and is less than the protection threshold $I_{SC}$, the delay time is $T_{EDI}$. When the discharging current exceeds the protection threshold $I_{SC}$, $T_{SC}$ is used as the delay time. Apparently, the discharging current increases gradually from $I_{EDI}$ to $I_{SC}$, the delay time decrease gradually from $T_{EDI}$ to $T_{SC}$.

Figure 3:
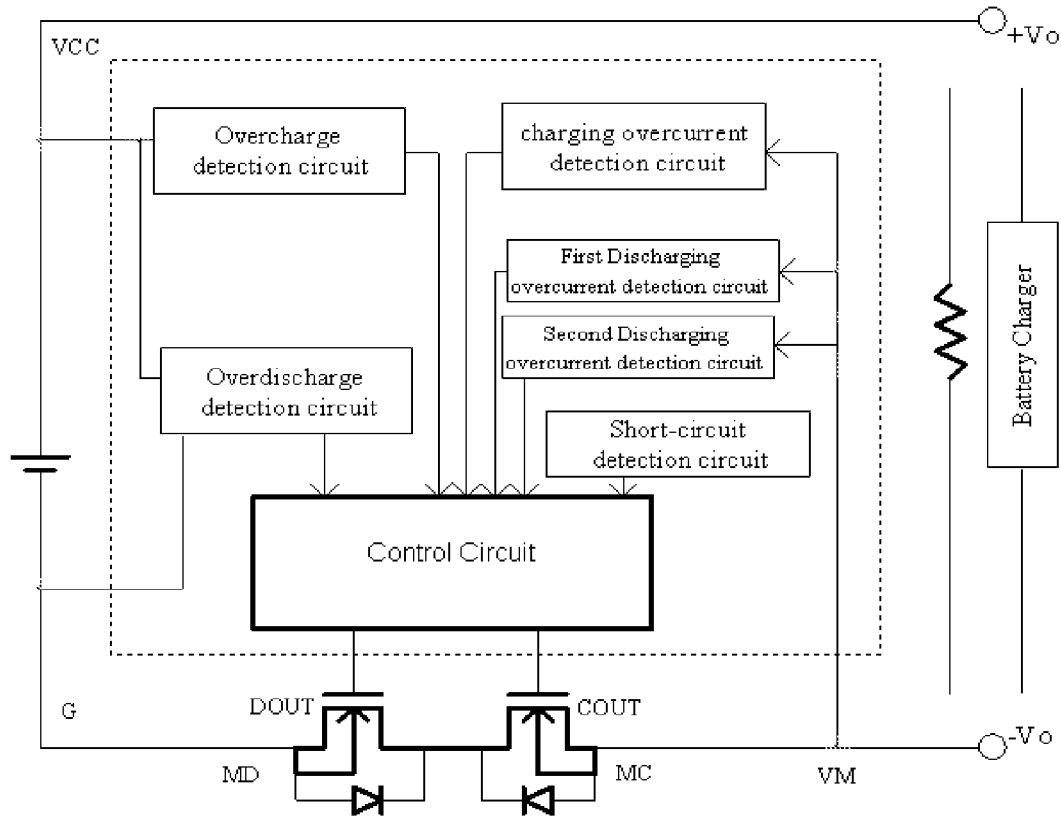
FIG. 3 is a circuit diagram showing another conventional battery protection circuit with three stages discharging overcurrent protection.

FIG. 3 is a circuit diagram showing another battery protection circuit with three stages discharging overcurrent protection. Because other overcurrent states between $I_{EDI}$ and $I_{SC}$ really exists, the batter protection circuit with three stages discharging overcurrent protection is proposed for efficiently protection. Referring to FIG. 3, the protection circuit comprises an overcharge detection circuit, an overdischarge detection circuit, a charging overcurrent detection circuit, a first discharging overcurrent detection circuit, a second discharging overcurrent detection circuit, a short detection circuit, a control circuit and output switches MD and MC. The operation principle of the protection circuit shown in FIG. 3 is identical with that of the protection circuit shown in FIG. 1. The difference is that the second discharging overcurrent diction circuit is added. The current protection threshold of the first discharging overcurrent diction circuit is $I_{EDI1}$, and the delay time of the first discharging overcurrent diction circuit is $T_{EDI1}$. The current protection threshold of the second discharging overcurrent diction circuit is $I_{EDI2}$, and the delay time of the second discharging overcurrent diction circuit is $T_{EDI2}$, wherein $I_{EDI1} < I_{EDI2} < I_{SC}$, and $T_{EDI1} > T_{EDI2} > T_{SC}$. As a result, one intermediate overcurrent protection state between $I_{EDI}$ and $I_{SC}$ are realized.

Figure 4:
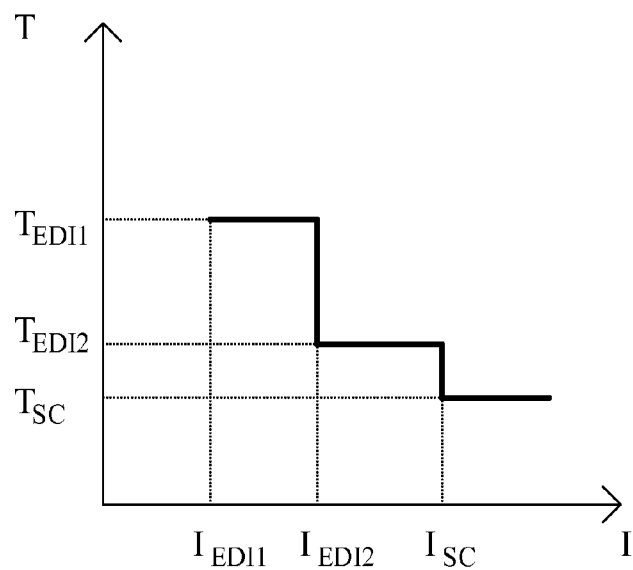
FIG. 4 is a curve diagram showing a relation between a discharging overcurrent and a delay time of the battery protection circuit shown in FIG. 2.

FIG. 4 is a curve diagram showing a relation between a discharging overcurrent and a delay time of the battery protection circuit shown in FIG. 3. As shown in FIG. 4, when the discharging current is larger than the protection threshold $I_{EDI1}$ and is less than the protection threshold $I_{EDI2}$, the delay time is $T_{EDI1}$. When the discharging current is larger than the protection threshold $I_{EDI2}$ and is less than the protection threshold $I_{SC}$, the delay time is $T_{EDI2}$. When the discharging current exceeds the protection threshold $I_{SC}$, $T_{SC}$ is used as the delay time. Apparently, the discharging current increases gradually from $I_{EDI1}$, $I_{EDI2}$ to $I_{SC}$, the delay time decrease gradually from $T_{EDI1}$, $T_{EDI2}$ to $T_{SC}$.

Figure 5:
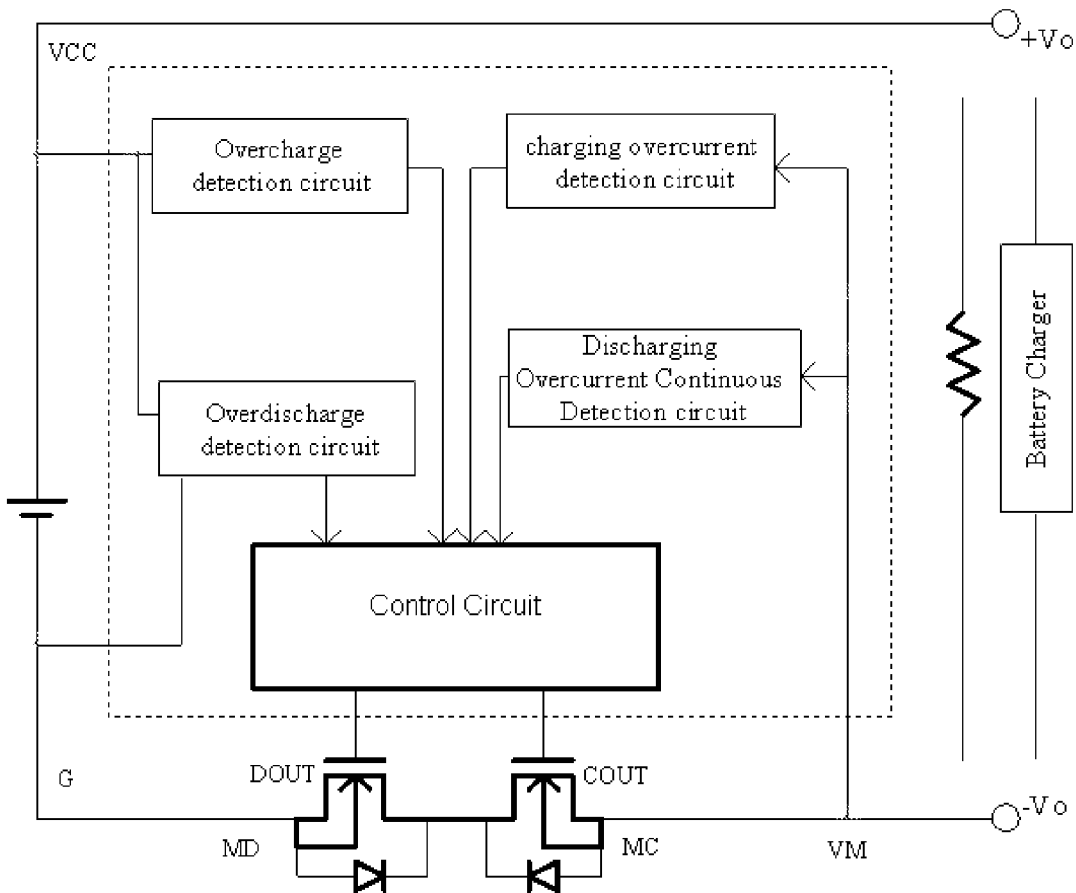
FIG. 5 is a circuit diagram showing a battery protection circuit according to one embodiment of the present invention.

Other overcurrent states really exist between $I_{EDI1}$ and $I_{EDI2}$ or between $I_{EDI2}$ and $I_{SC}$. Hence, these intermediate overcurrent state should also be protected. FIG. 5 is a circuit diagram showing a battery protection circuit according to one embodiment of the present invention. As shown in FIG. 5, the protection circuit comprises an overcharge detection circuit, an overdischarge detection circuit, a charging overcurrent detection circuit, a discharging continuous overcurrent detection circuit, a control circuit and output switches MD and MC. The discharging overcurrent and the delay time follows the relationship hereafter:

$$T_{EDI} = \frac{Q}{I_{EDI}}$$

where $T_{EDI}$ is the delay time, $I_{EDI}$ is the discharging over, Q is designed to be a constant.

Figure 6:
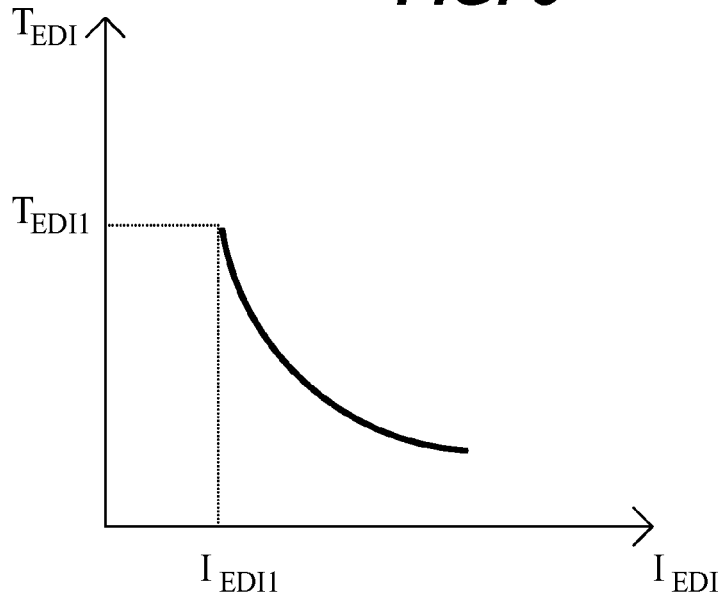
FIG. 6 is a curve diagram showing a relation between a discharging overcurrent and a delay time of the battery protection circuit shown in FIG. 5.

FIG. 6 is a curve diagram showing a relation between a discharging overcurrent and a delay time of the battery protection circuit shown in FIG. 5. As shown in FIG. 6, the delay time $T_{EDI}$ is inversely proportional to the discharging current $I_{EDI2}$. As a result, it can be realized that the delay time changes along with continuous changes of the discharging current.

Figure 7:
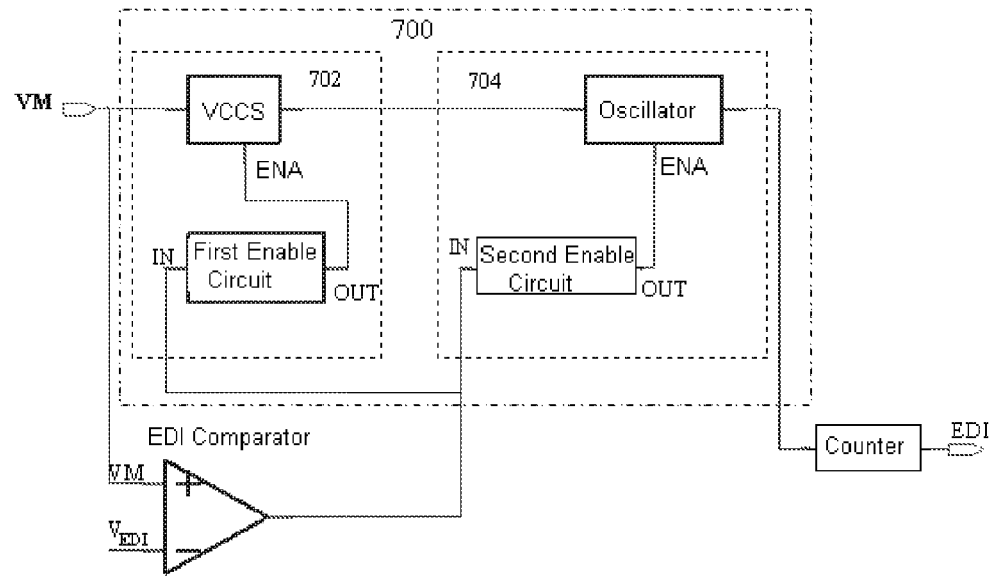
FIG. 7 is a block diagram schematically showing a discharging continuous overcurrent detection circuit of the battery protection circuit shown in FIG. 5.

FIG. 7 is a block diagram schematically showing a discharging continuous overcurrent detection circuit of the battery protection circuit shown in FIG. 5. The discharging continuous overcurrent detection circuit is configured for determining whether there are discharging overcurrent on the battery by detecting a voltage drop on the output switches MD and MC (between a node VM and a node G) and comparing the voltage drop with a certain voltage protection threshold $V_{EDI}$. If the voltage drop on the output switches is larger than the protection threshold $V_{EDI}$ and this state keeps a period of time beyond a certain delay time $T_{EDI}$, the control circuit driven by the overcurrent detection circuit outputs a control signal to switch off the output switches MD and MC, thereby the discharging to the battery is prohibited.

As shown in FIG. 7, the overcurrent detection circuit comprises an overcurrent comparator circuit, a voltage controlled oscillator circuit 700, and a counter.

The overcurrent comparator circuit is configured for comparing a detected voltage representative of the discharging current with a voltage protection threshold $V_{EDI}$. If the detected voltage is larger than the voltage protection threshold $V_{EDI}$, the overcurrent comparator circuit output an enable signal to enable the voltage controlled oscillator circuit; otherwise, the overcurrent comparator circuit output a disable signal to disable the voltage controlled oscillator circuit.

The voltage controlled oscillator circuit 700 starts working after receiving the enable signal from the overcurrent comparator circuit and stop working after receiving the disable signal from the overcurrent comparator circuit. The voltage controlled oscillator circuit 700 is configured for generating an oscillation signal with a cycle depending on the detected voltage. The counter is configured for outputting a driven signal after counting a given number of oscillation signals. The control circuit generates a control signal to switch off the output switches MD and MC after receiving the driven signal, thereby the discharging to the battery is prohibited.

The voltage controlled oscillator circuit 700 comprises a voltage controlled current source circuit 702 and an oscillator circuit 704. The voltage controlled current source 702 comprises a voltage controlled current source for generating a current depending on the detected voltage and a first enable circuit for receiving the enable signal from the overcurrent comparator circuit and enabling the voltage controlled current source. The oscillator circuit 704 comprises an oscillator for generating the oscillation signal with a cycle depending on the current of the voltage controlled current source and a second enable circuit for receiving the enable signal from the overcurrent comparator circuit and enabling the oscillator. In a preferred embodiment, the current generated by the voltage controlled current source is proportional to the detected voltage, and the cycle of the oscillation signal generated by the oscillator is inversely proportional to the current of the voltage controlled current source.

Figure 8:
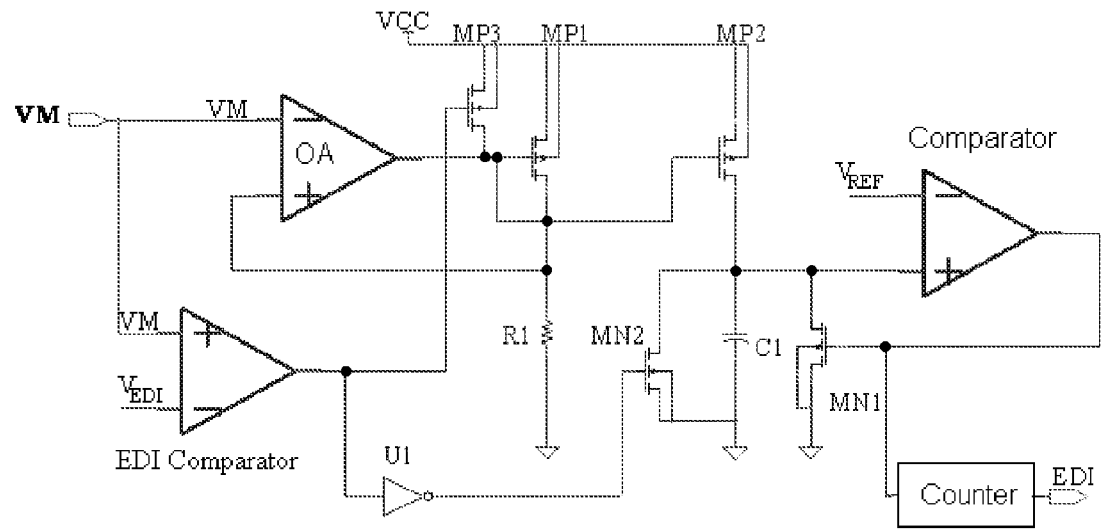
FIG. 8 is a circuit diagram showing a practical implement of the discharging overcurrent detection circuit shown in FIG. 7.

FIG. 8 is a circuit diagram showing a practical implement of the discharging overcurrent detection circuit shown in FIG. 7. The voltage controlled current source comprises an operation amplifier, a first transistor MP1, a second transistor MP2 and a resistor R1. In one embodiment, the first and second transistors are p-type MOS transistors.

Gates of the first and second transistors MP1 and MP2 are coupled with each other, sources of the first and second transistors are coupled to a power supply VCC, and the gate of the first transistor MP1 is coupled to a drain of the first transistor MP1. The drain of the first transistor MP1 is connected with one terminal of the resistor R1, the other terminal of the resistor R1 is connected to a ground reference. A negative input terminal of the operation amplifier as an input terminal of the voltage controlled current source is coupled to the detected voltage VM, a positive input terminal of the operation amplifier is connected to the drain of the first transistor MP1. An output terminal of the operation amplifier is coupled to the gate of the first transistor MP1. A drain of the second transistor MP2 is regarded as an output terminal of the voltage controlled current source.

The first and second transistors MP1 and MP2 form a current mirror. The positive terminal of the operation amplifier is used for sampling a voltage drop on the resistor R1. The operation amplifier is configured for comparing the voltage drop $V_{R1}$ on the resistor R1 with the detected voltage VM and amplifying difference between the voltage drop and the detected voltage VM to control the first transistor MP1. In stabilization state, the voltage drop $V_{R1}$ will be equal to the detected voltage VM, so the current $I_{MP1}$ of the transistor MP1 may be:

$I_{MP1} = VM/R1$

The current $I_{MP2}$ of the second transistor MP2 flows into the oscillator circuit 704. The current $I_{MP2}$ of the second transistor MP2 may be equal to the current $I_{MP1}$ of the first transistor MP1. It can be seen that the current $I_{MP2}$ generated by the voltage controlled current source is proportional to the detected voltage VM.

A third transistor MP3 which may be p-type serves as the first enable circuit in one embodiment. A drain of the third transistor MP3 is coupled to the gate of the first transistor MP1, and a source of the third transistor MP3 is coupled to the power supply VCC. A gate of the third transistor MP3 is provided for receiving the enable signal or disable signal from the overcurrent comparator circuit. When the enable signal is sent to the gate of the third transistor MP3, the third transistor MP3 is turned off, thereby the voltage controlled current source starts working and outputting the current $I_{MP2}$ to the oscillator. When the disable signal is sent to the gate of the third transistor MP3, the third transistor MP3 is turned on to disable the first transistor MP1, thereby the voltage controlled current source stop working and outputting the current $I_{MP2}$.

The oscillator comprises a capacitor C1, an oscillation comparator and a fourth transistor MN1. One terminal of the capacitor C1 is connected to the drain of the second transistor MP4 and further connected to a positive input terminal of the oscillation comparator, and the other terminal of the capacitor C1 is connected to the ground reference. A negative input terminal of the oscillation comparator is connected to a reference voltage $V_{REF}$. A drain of the transistor MN1 is connected to the positive input terminal of the oscillation comparator, a source of the transistor MN1 is connected to the ground reference, and a gate of the transistor MN1 is connected to an output terminal of the oscillation comparator. The fourth transistor MN1 is an n-type transistor in one embodiment.

In operation of the oscillator, the current $I_{MP2}$ of the voltage controlled current source is used to charge the capacitor C1 slowly. Once a voltage drop on the capacitor C1 is larger than the reference voltage $V_{REF}$, the oscillation comparator inverts to output a discharging control signal to the gate of the transistor MN1. The transistor MN1 is turned on to switch on the positive terminal of the oscillation comparator and the ground reference. Thus, the capacitor C1 is discharged quickly by the transistor MN1 until the voltage drop on the capacitor C1 decreases to the ground reference. Once the voltage drop on the capacitor C1 is less than the reference voltage $V_{REF}$, the oscillation comparator inverts to output a charging control signal to the gate of the transistor MN1. The control signal from the oscillation comparator is delayed a period of time so that before the transistor MN1 receives the control signal of the oscillation comparator, the capacitor C1 has been discharged completely. When the transistor MN1 receives the charging control signal, the transistor MN1 is turned off to switch off the positive terminal of the oscillation comparator and the ground reference. Thus, the capacitor C1 is slowly charged again. Repeating the above operations, the oscillation signal with a cycle in proportion to the current $I_{MP2}$ is generated.

Provided that the current $I_{MP1}$ of the transistor MP1 is equal to the current $I_{MP2}$ of the transistor MP2 in one embodiment, the cycle $T_{OSC}$ of the oscillation signal may be:

$$T_{OSC} = \frac{V_{REF} \cdot C1}{I_{MP2}} = \frac{V_{REF} \cdot R1 \cdot C1}{VM} = \frac{V_{REF} \cdot R1 \cdot C1}{I_{EDI} \cdot (R_{ON\_MD} + R_{ON\_MC})}$$

The delay time $T_D$ is N number of oscillation signal, so $T_D$ is:

$$T_D = \frac{N \cdot V_{REF} \cdot R1 \cdot C1}{I_{EDI} \cdot (R_{ON\_MD} + R_{ON\_MC})} = \frac{Q}{I_{EDI}}$$

where $$Q = \frac{N \cdot V_{REF} \cdot R1 \cdot C1}{(R_{ON\_MD} + R_{ON\_MC})}.$$

It can be seen that the delay time $T_D$ is inversely proportional to the discharging current $I_{EDI}$. An inverter and a fifth transistor MN2 which may be n-type serve as the second enable circuit in one embodiment. An output terminal of the inverter is connected to a gate of the transistor MN2. A source of the transistor MN2 is connected to the ground reference, and a drain of the transistor MN2 is connected to the positive terminal of the oscillation comparator. An input terminal of the inverter is provided for receiving the enable signal or disable signal from the overcurrent comparator circuit. When the enable signal is sent to the inverter, the firth transistor MN2 is turned off, thereby the oscillator starts working and outputting the oscillation signal. When the disable signal is sent to the inverter, the fifth transistor MN2 is turned on, thereby the oscillator stops outputting the oscillation signal.

The present invention has been described in sufficient details with a certain degree of particularity. It is understood to those skilled in the art that the present disclosure of embodiments has been made by way of examples only and that numerous changes in the arrangement and combination of parts may be resorted without departing from the spirit and scope of the invention as claimed. Accordingly, the scope of the present invention is defined by the appended claims rather than the foregoing description of embodiments.

What is claimed is:

1. An overcurrent protection circuit comprising:
 a comparator configured for generating an enable signal if a detected voltage representative of a discharging current in a discharging path is larger than a voltage protection threshold;
 a voltage controlled oscillator circuit configured to generate an oscillation signal with a cycle in proportion to the detected voltage after receiving the enable signal from the comparator;
 a counter configured to generate an overcurrent detection signal after counting a predetermined number of the oscillation signals; and
 a control circuit configured to output an off signal to switch off the discharging path after receiving the overcurrent detection signal.

2. The overcurrent protection circuit according to claim 1, further comprising an output switch in the discharging path, wherein the output switch switches off the discharging path according to the off signal.

3. The overcurrent protection circuit according to claim 1, wherein the detected voltage is a voltage drop on the output switch.

4. The overcurrent protection circuit according to claim 1, wherein the voltage controlled oscillator circuit comprises:
 a voltage controlled current source configured to generate a current in proportion to the detected voltage after receiving the enable signal from the comparator;
 an oscillator configured to receive the current from the voltage controlled current source and generate the oscillation signal with a cycle in inverse proportion to the current from the voltage controlled current source after receiving the enable signal from the comparator.

5. The overcurrent protection circuit according to claim 4, wherein the voltage controlled current source comprises:
 first and second transistors, gates of the first and second transistors coupled with each other and further coupled to a drain of the first transistor, sources of the first and second transistors coupled to a power supply, the drain of the first transistor further coupled to one terminal of a resistor, the other terminal of the resistor coupled to a ground reference;
 an operation amplifier having one input terminal coupled to the detected voltage, the other input terminal coupled to the drain of the first transistor, and an output terminal coupled to the gate of the first transistor; and wherein a drain of the second transistor is taken as an output terminal of the voltage controlled current source to output the current in proportion to the detected voltage.

6. The overcurrent protection circuit according to claim 5, wherein the voltage controlled current source further comprises: a third transistor serving as an enable circuit and having a source coupled to the power supply, a drain coupled to the gate of the first transistor and a gate for receiving the enable signal from the comparator.

7. The overcurrent protection circuit according to claim 4, wherein the oscillator comprises:
 a capacitor having a first terminal for receiving the current from the voltage controlled current source, a second terminal coupled to a ground reference;
 an oscillation comparator having one input terminal coupled to the first terminal of the capacitor, the other input terminal coupled to a predetermined reference voltage and an output terminal for outputting a discharging signal if a voltage drop on the capacitor is larger than the predetermined reference voltage and a charging signal if the voltage drop on the capacitor is less than the predetermined reference voltage; and
 a discharging circuit for discharging the capacitor when receiving the discharging signal and stopping discharging the capacitor when receiving the charging signal, wherein a signal on the first terminal of the capacitor is taken as the oscillation signal with a cycle in inverse proportion to the current from the voltage controlled current source.

8. The overcurrent protection circuit according to claim 7, wherein the oscillator further comprises:
an inverter and a fourth transistor serving as an enable circuit, wherein an input terminal of the inverter is provided for receiving the enable signal from the comparator, an output terminal of the inverter is coupled to a gate of the fourth transistor, a source of the fourth transistor is coupled to the ground reference, and a drain of the fourth transistor is coupled to the first terminal of the capacitor.

9. The overcurrent protection circuit according to claim 7, wherein a fifth transistor serves as the discharging circuit, and wherein a gate of the fifth transistor is coupled to the output terminal of the oscillation comparator, a source of the fifth transistor is coupled to the ground reference, and a drain of the fifth transistor is coupled to the first terminal of the capacitor.

10. An overcurrent detection circuit comprising:
a comparator configured to generate an enable signal if a detected voltage representative of a discharging current in a discharging path is larger than a voltage protection threshold;
a voltage controlled current source configured to generate a current in proportion to the detected voltage after receiving the enable signal from the comparator;
an oscillator configured to receive the current from the voltage controlled current source and generate an oscillation signal with a cycle in inverse proportion to the current from the voltage controlled current source after receiving the enable signal from the comparator; and
a counter configured to generate an overcurrent detection signal after counting a predetermined number of the oscillation signals.

11. The overcurrent detection circuit according to claim 10, wherein the voltage controlled current source comprises:
first and second transistors, gates of the first and second transistors coupled with each other and further coupled to a drain of the first transistor, sources of the first and second transistors coupled to a power supply, the drain of the first transistor further coupled to one terminal of a resistor, the other terminal of the resistor coupled to a ground reference;
an operation amplifier having one input terminal coupled to the detected voltage, the other input terminal coupled to the drain of the first transistor, and an output terminal coupled to the gate of the first transistor, wherein a drain of the second transistor is taken as an output terminal of the voltage controlled current source to output the current in proportion to the detected voltage.

12. The overcurrent detection circuit according to claim 11, wherein the voltage controlled current source further comprises:
a third transistor serving as an enable circuit and having a source coupled to the power supply, a drain coupled to the gate of the first transistor and a gate for receiving the enable signal from the comparator.

13. The overcurrent detection circuit according to claim 10, wherein the oscillator comprises:

a capacitor having a first terminal for receiving the current from the voltage controlled current source, a second terminal coupled to a ground reference;
an oscillation comparator having one input terminal coupled to the first terminal of the capacitor, the other input terminal coupled to a predetermined reference voltage and an output terminal for outputting a discharging signal if a voltage drop on the capacitor is larger than the predetermined reference voltage and a charging signal if the voltage drop on the capacitor is less than the predetermined reference voltage;
a discharging circuit for discharging the capacitor when receiving the discharging signal and stopping discharging the capacitor when receiving the charging signal, wherein a signal on the first terminal of the capacitor is taken as the oscillation signal with a cycle in inverse proportion to the current from the voltage controlled current source.

14. The overcurrent detection circuit according to claim 13, wherein the oscillator further comprises:
an inverter and a fourth transistor serving as an enable circuit, wherein an input terminal of the inverter is provided for receiving the enable signal from the comparator, an output terminal of the inverter is coupled to a gate of the fourth transistor, a source of the fourth transistor is coupled to the ground reference, and a drain of the fourth transistor is coupled to the first terminal of the capacitor.

15. A voltage controlled oscillator comprising:
first and second transistors, gates of the first and second transistors coupled with each other and further coupled to a drain of the first transistor, sources of the first and second transistors coupled to a power supply, the drain of the first transistor further coupled to one terminal of a resistor, the other terminal of the resistor coupled to a ground reference;
an operation amplifier having one input terminal coupled to an input voltage, the other input terminal coupled to the drain of the first transistor, and an output terminal coupled to the gate of the first transistor;
a capacitor having a first terminal coupled to a drain of the second transistor, a second terminal coupled to the ground reference;
an oscillation comparator having one input terminal coupled to the first terminal of the capacitor, the other input terminal coupled to a predetermined reference voltage and an output terminal;
a third transistor having a gate coupled to the output terminal of the oscillation comparator, a source coupled to the ground reference and a drain coupled to the first terminal of the capacitor, wherein a signal on the first terminal of the capacitor is taken as an oscillation signal with a cycle in inverse proportion to the input voltage.

16. The voltage controlled oscillator according to claim 15, wherein the oscillation comparator comprise a delay circuit therein.

17. The voltage controlled oscillator according to claim 15, wherein the first and second transistors are p-type, and the third transistor is n-type.

* * * * *